United States Patent [19]

Kunde et al.

[11] Patent Number: 5,256,773
[45] Date of Patent: Oct. 26, 1993

[54] COPPER COMPLEXES OF 4-FLUORO-5-CHLOROPYRIMIDIN-6-YL CONTAINING RACTIVE MONDAZO DYES

[75] Inventors: Klaus Kunde, Neunkirchen; Hermann Henk, Cologne; Karl-Heinz Schündehütte, deceased, late of Leverkusen, by Eva Schündehütte, heir; Frank-Michael Stöhr, Odenthal, all of Fed. Rep. of Germany

[73] Assignee: Bayer Aktiengesellschaft, Leverkusen, Fed. Rep. of Germany

[21] Appl. No.: 990,631

[22] Filed: Dec. 14, 1992

Related U.S. Application Data

[63] Continuation of Ser. No. 697,869, May 9, 1991, abandoned.

[30] Foreign Application Priority Data

May 18, 1990 [DE] Fed. Rep. of Germany ....... 4016058

[51] Int. Cl.$^5$ .................... C09B 62/255; D06P 1/382
[52] U.S. Cl. .................... 534/627; 534/622; 8/549; 8/917; 8/918; 8/924
[58] Field of Search ......................... 534/627

[56] References Cited

U.S. PATENT DOCUMENTS 4,007,164 2/1977 Bien et al. ............... 534/627

FOREIGN PATENT DOCUMENTS 3835725 4/1990 Fed. Rep. of Germany .
1275623 12/1960 France .
1570565 3/1968 France .
1009471 11/1965 United Kingdom .

*Primary Examiner*—Mary C. Lee
*Assistant Examiner*—Fiona T. Powers
*Attorney, Agent, or Firm*—Sprung Horn Kramer & Woods

[57] ABSTRACT

The reactive dyes of the formula

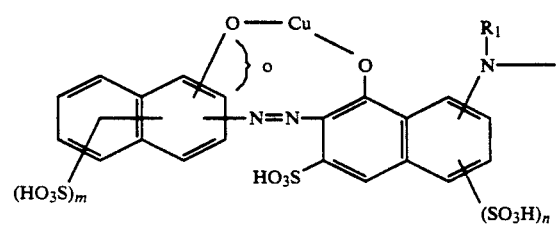

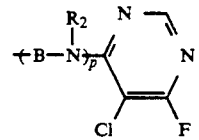

in which the substituents and indices have the meaning given in the description, are outstandingly suitable for dyeing or printing naturally occurring or synthetic materials containing hydroxyl or amide groups.

4 Claims, No Drawings

COPPER COMPLEXES OF 4-FLUORO-5-CHLOROPYRIMIDIN-6-YL CONTAINING RACTIVE MONDAZO DYES

This application is a continuation of application Ser. No. 697,869, filed May 9, 1991, now abandoned.

The invention relates to new reactive dyes of the formula

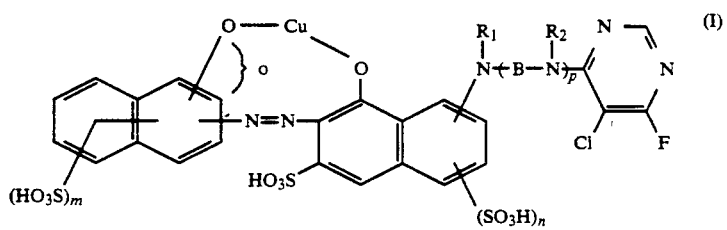

in which

B represents

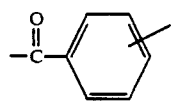

$R_1$ and $R_2$ independently of one another each represent hydrogen, $C_1$-$C_4$-alkyl or $C_2$-$C_4$-hydroxyalkyl, m represents 1, 2 or 3, n represents 0 or 1 and p represents 0 or 1, with the proviso that p represents 1 if n represents 1 and at the same time the substituents

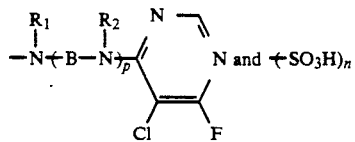

are in the ortho-position relative to one another, processes for their preparation and their use for dyeing or printing materials containing hydroxyl or amide groups.

Preferred dyes of the formula (I) are those in which $R_1$ and $R_2$ independently of one another each represent hydrogen, methyl or 2-hydroxyethyl and B, m, n and p have the abovementioned meaning.

Particularly preferred dyes are those of the formulae

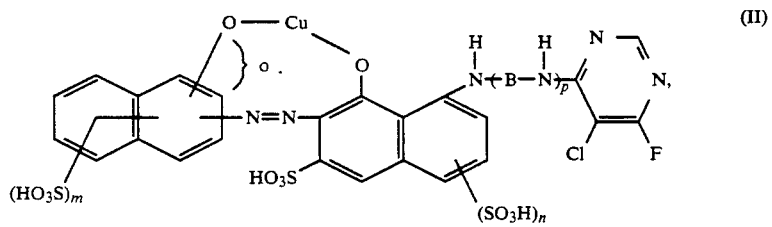

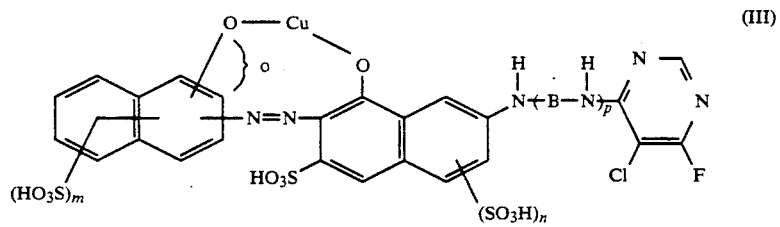

and

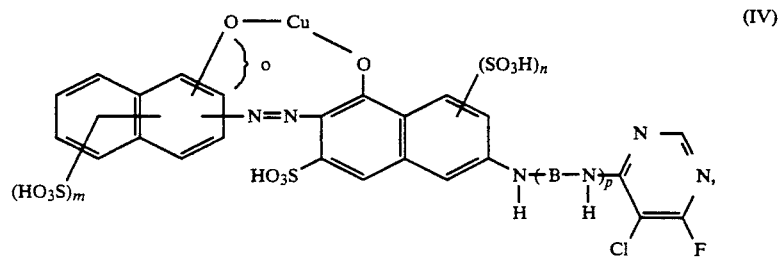

in which

B, m, n and p have the abovementioned meaning.

Dyes which are of particular interest are those of the formulae

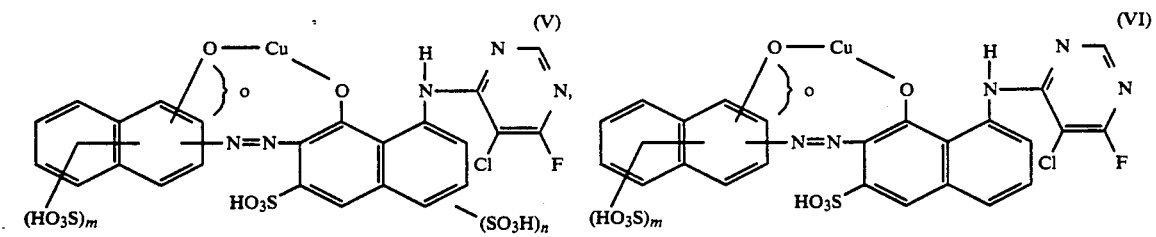

and

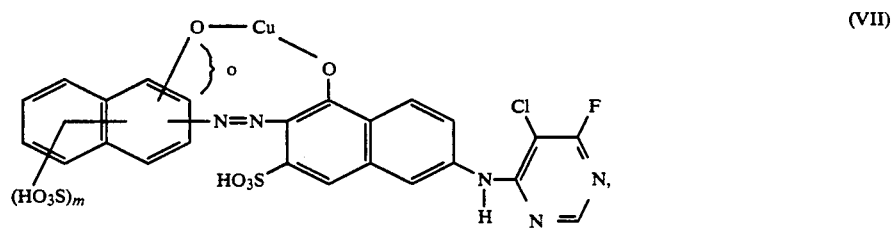

in which
m and n have the abovementioned meaning.

The new dyes of the formula (I) can be prepared by a process in which either
(a) compounds of the formula

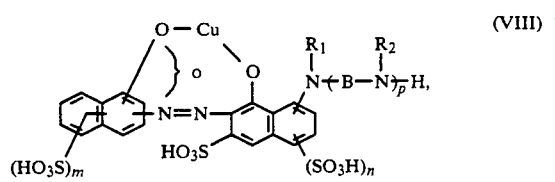

in which
B, $R_1$, $R_2$, m, n and p have the abovementioned meaning,
with the proviso that
represents 1 if n represents 1
and at the same time the substituents

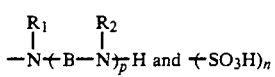

are in the ortho-position relative to one another, are reacted with 5-chloro-4,6-difluoropyrimidine, or
b) compounds of the formula

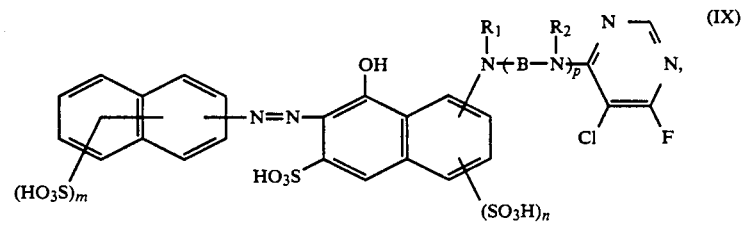

in which
B, $R_1$, $R_2$, m, n and p have the abovementioned meaning,
with the proviso that
p represents 1 if n represents 1
and the substituents

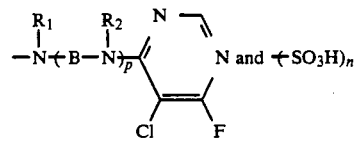

are in the ortho-position relative to one another, are treated with copper salts and oxidising agents.

The compounds of the formula (VIII) are obtained by a process in which either
b) o-aminonaphtholsulphonic acids of the formula

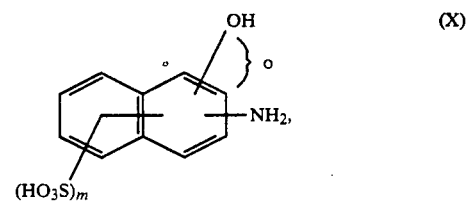

in which
m has the abovementioned meaning,
are diazotised, the diazotisation products are coupled with aminonaphtholsulphonic acids of the formula

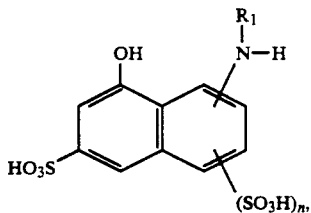

in which
R₁ and n have the abovementioned meaning,
and the coupling products are converted into the copper(II) complexes, if appropriate after they have been converted into the corresponding N-aminobenzoyl derivatives, for example by reaction with m- or p-nitrobenzoyl chloride and subsequent reduction of the nitro group with sodium sulphide or by reaction with isatoic anhydride, or c) aminonaphthalenesulphonic acids of the formula

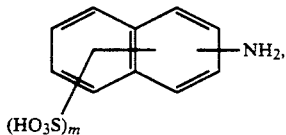

in which
m has the abovementioned meaning,
are diazotised, the diazotisation products are reacted with aminonaphthol acids of the formula (XI) or N-aminobenzoyl derivatives thereof to give compounds of the formula

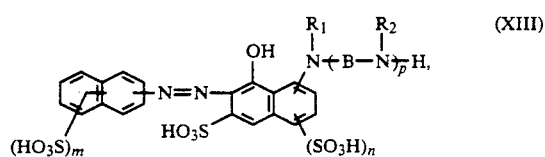

in which
B, $R_1$, $R_2$, m, n and p have the abovementioned meaning, with the proviso that
p represents 1 if n represents 1
and at the same time the substituents

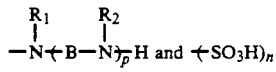

are in the ortho-position relative to one another,
and these compounds are converted into the copper(II) complexes in a manner which is known per se with copper salts and oxidising agents, for example with copper(II) sulphate or copper(II) acetate and hydrogen peroxide.

It may be advantageous here first to convert the amino groups —$NHR_1$ or —$NHR_2$ into the corresponding amides by acylation with, for example, acetic anhydride, acetyl chloride or maleic anhydride; if appropriate, the acyl radicals are then split off again selectively by hydrolysis after the reaction with the copper salts and oxidising agents.

Examples of o-aminonaphtholsulphonic acids of the formula (X) are:

4-amino-3-hydroxy-1-naphthalenesulphonic acid,
3-amino-4-hydroxy-1-naphthalenesulphonic acid,
5-amino-6-hydroxy-2-naphthalenesulphonic acid,
8-amino-7-hydroxy-2-naphthalenesulphonic acid,
6-amino-7-hydroxy-2-naphthalenesulphonic acid,
7-amino-6-hydroxy-1,3-naphthalenedisulphonic acid,
4-amino-3-hydroxy-1,7-naphthalenedisulphonic acid,
3-amino-4-hydroxy-1,7-naphthalenedisulphonic acid.

Examples of aminonaphtholsulphonic acids of the formula (XI) are:

7-amino-4-hydroxy-naphthalene-2-sulphonic acid (I acid),
N-methyl-I acid, N-(2-hydroxyethyl)-I acid,
6-amino-4-hydroxy-naphthalene-2-sulphonic acid (gamma acid),
N-methylgamma acid, N-(2-hydroxyethyl)-gamma acid,
6-amino-4-hydroxy-naphthalene-2,7-disulphonic acid (RR acid),
N-methyl-RR acid,
b 5-amino-4-hydroxy-naphthalene-2,7-disulphonic acid (H acid),
4-amino-5-hydroxy-naphthalene-1,7-disulphonic acid (K acid),
3-amino-8-hydroxy-1,6-naphthalenedisulphonic acid,
8-amino-4-hydroxy-naphthalene-2-sulphonic acid (M acid),
2-amino-5-hydroxy-1,7-naphthalenedisulphonic acid,
5-amino-4-hydroxy-2-naphthalenesulphonic acid.

Examples of aminonaphthalenesulphonic acids of the formula (XII) are:

5-, 6- or 7-amino-1-naphthalenesulphonic acid,
4-, 5-, 6-, 7- or 8-amino-2-naphthalenesulphonic acid,
3- or 4-amino-1,5-naphthalenedisulphonic acid,
5-, 6- or 7-amino-1,3-naphthalenedisulphonic acid,
4-amino-1,6- or -1,7-naphthalenedisulphonic acid,
7- or 8-amino-1,3,5-naphthalenetrisulphonic acid.

The compounds of the general formula (IX) are obtained by reacting compounds of the general formula (XIII) with 5-chloro-4,6-difluoropyrimidine.

The reaction with 5-chloro-4,6-difluoropyrimidine is carried out in an aqueous medium at temperatures between 20° and 100° C. and at pH values of between 4 and 10.

The reactive dyes of the formula (I) can be isolated and processed to give dry dyeing preparations. The isolation is preferably carried out at the lowest possible temperatures by salting out and filtration. The filtered dyes can be dried, if appropriate after addition of extenders and/or buffers, for example after addition of a mixture of equal parts of mono- and disodium phosphate; the drying is preferably carried out at temperatures which are not too high and under reduced pressure. In certain cases, the dry preparations according to the invention can be prepared directly, that is to say without intermediate isolation for dyes, by spray-drying the entire production mixture.

The reactive dyes of the formula (I) are distinguished by a high reactivity and give dyeings with good fastnesses to wet processing and light. It is to be particularly emphasised that the dyes have a good solubility and electrolyte solubility coupled with good exhaustion properties and high fixing of the dyes, and that the non-fixed portions can easily be removed.

The reactive dyes of the formula (I) are suitable for dyeing and printing various substrates, for example those containing hydroxyl groups or amide groups, such as silk, leather, wool, high molecular weight polyamide fibres and high molecular weight polyamide-urethanes, but especially cellulose-containing materials of a fibrous structure, such as linen, cellulose, regenerated cellulose and above all cotton. They are suitable both for the exhaustion process and for dyeing by the pad-dyeing process, in which the goods are impregnated with aqueous and if appropriate also salt-containing dye solutions and the dyes are fixed, if appropriate under the action of heat, after an alkali treatment or in the presence of alkali. They are also suitable for printing, in particular on cotton, but similarly also for printing nitrogen-containing fibres, for example wool, silk or blended fabrics containing wool.

It is advisable to subject the dyeings and prints to thorough rinsing with cold and hot water, if appropriate with the addition of an agent which has a dispersing action and promotes diffusion of the non-fixed portions.

The formulae stated are those of the free acids. The salts, in particular the alkali metal salts, such as the sodium, potassium or lithium salts, are in general obtained during the preparation. However, the dyes can also be employed as concentrated solutions.

EXAMPLE 1

31.9 g of H acid are dissolved in 500 ml of water at pH 8 with sodium carbonate solution and the solution is heated to 40° C. 18 g of 5-chloro-4,6-difluoropyrimidine are added and the mixture is stirred at this temperature until the condensation has ended, during which the pH is kept constant with sodium carbonate solution. 30.3 g of 3-amino-1,5-naphthalenedisulphonic acid are dissolved in 500 ml of water at 20° C. 100 g of ice and 30 ml of concentrated hydrochloric acid are added and the amine is diazotised with 6.9 g of sodium nitrite. The suspension of the diazonium compound is added dropwise to the solution, cooled to 10° C., of the condensation product, during which the pH is kept constant with sodium carbonate solution. The coupling product is precipitated by addition of 250 g of salt and isolated, and is dissolved in 1000 ml of water at pH 6 and at 40° C. 25 g of copper(II) sulphate.5H$_2$O are added, and 70 ml of 10% strength hydrogen peroxide solution are slowly added dropwise, during which the pH is kept at 6 with sodium carbonate solution. When the complexing has ended, the dye is precipitated by addition of 200 g of salt, isolated and dried. It dyes cotton blue.

EXAMPLES 2 to 7

If, instead of the coupling component employed in Example 1, equimolar amounts of the condensation products of 5-chloro-4,6-difluoropyrimidine and K acid, I acid, gamma acid, M acid, 3-amino-8-hydroxy-1,6-naphthalenedisulphonic acid or 5-amino-4-hydroxy-2-naphthalenesulphonic acid are used, reactive dyes which dye cotton blue are likewise obtained.

EXAMPLES 8 to 13

If, instead of the diazo component employed in Example 1, equimolar amounts of 6-amino-1,3-naphthalenedisulphonic acid,
7-amino-1,3-naphthalenedisulphonic acid,
4-amino-1,6-naphthalenedisulphonic acid,
4-amino-1,7-naphthalenedisulphonic acid,
7-amino-1,3,5-naphthalenetrisulphonic acid or
6-amino-2-naphthalenesulphonic acid
are used, reactive dyes which dye cotton blue are likewise obtained.

Blue reactive dyes are likewise obtained if the aminonaphtholsulphonic acids employed in Examples 2 to 7 are used instead of H acid.

EXAMPLE 14

25 g of diazoamidol acid (diazonium compound of 4-amino-3-hydroxy-1-naphthalenesulphonic acid) are dissolved in 200 ml of water with 4 g of sodium hydroxide at 20° C. 9 g of zinc sulphate.H$_2$O and 15 ml of concentrated ammonia solution are added, and a neutral solution of 31.9 g of H acid in 500 ml of water is then added. The pH is kept at 7 to 7.5 with dilute sodium hydroxide solution until the coupling has ended. The mixture is heated to 40° C. and 18 g of 5-chloro-4,6-difluoropyrimidine are added. The condensation is brought to completion at pH 9. The dye is precipitated by addition of 140 g of salt, isolated and dried. Blue prints are obtained with this dye on cotton.

EXAMPLES 15 to 19

If, instead of the coupling component employed in Example 14, equimolar amounts of K acid, I acid, 3-amino-8-hydroxy-naphthalene-1,6-disulphonic acid (W acid), M acid or 5-amino-4-hydroxy-2-naphthalenesulphonic acid are used, reactive dyes which give blue prints on cotton are likewise obtained.

EXAMPLES 20 to 22

If, instead of the diazo component employed in Example 14, equimolar amounts of
4-amino-3-hydroxy-1,7-naphthalenedisulphonic acid,
3-amino-4-hydroxy-1-naphthalenesulphonic acid or
3-amino-4-hydroxy-1,7-naphthalenedisulphonic acid
are used, reactive dyes which give blue prints on cotton are likewise obtained.

EXAMPLE 23

43.8 g of N-(4-aminobenzoyl)-H acid are dissolved in 500 ml of water at pH 7 with sodium carbonate solution and the solution is heated to 40° C. 18 g of 5-chloro-4,6-difluoropyrimidine are added and the mixture is stirred at this temperature until the condensation has ended, during which the pH is kept constant with sodium carbonate solution. 30.3 g of 3-amino-1,5-naphthalenedisulphonic acid are dissolved in 500 ml of water at 20° C. 100 g of ice and 30 ml of concentrated hydrochloric acid are added and the amine is diazotised with 6.9 g of sodium nitrite. The suspension of the diazonium compound is added dropwise to the solution, cooled to 10° C., of the condensation product, during which the pH is kept constant with sodium carbonate solution. The coupling product is precipitated by addition of 250 g of salt, isolated and dissolved in 1000 ml of water at pH 6 and at 40° C. 25 g of copper(II) sulphate.5H$_2$O are added, and 70 ml of 10% strength hydrogen peroxide solution are slowly added dropwise, during which the pH is kept at 6 with sodium carbonate solution. When the complexing has ended, the dye is precipitated by addition of 200 g of salt, isolated and dried. It dyes cotton blue.

EXAMPLES 24 to 30

If, instead of the coupling component employed in Example 23, equimolar amounts of the condensation products of 5-chloro-4,6-difluoropyrimidine with the N-(4-aminobenzoyl) derivatives of K acid, W acid, RR acid, 2-amino-5-hydroxy-1,7-naphthalenedisulphonic acid, I acid, gamma acid or 5-amino-4-hydroxy-2-naphthalenesulphonic acid are used, reactive dyes which dye cotton blue are likewise obtained.

EXAMPLES 31 to 36

If, instead of the diazo component employed in Example 23, equimolar amounts of
6-amino-1,3-naphthalene-disulphonic acid,
7-amino-1,3-naphthalenedisulphonic acid,
4-amino-1,6-naphthalenedisulphonic acid,
4-amino-1,7-naphthalenedisulphonic acid,
7-amino-1,3,5-naphthalenetrisulphonic acid or
6-amino-2-naphthalenesulphonic acid
are employed, reactive dyes which dye cotton blue are likewise obtained.

Blue reactive dyes are likewise obtained if the aminonaphtholsulphonic acids employed in Examples 2 to 7 are used instead of H acid.

We claim:

1. A reactive dye of the formula:

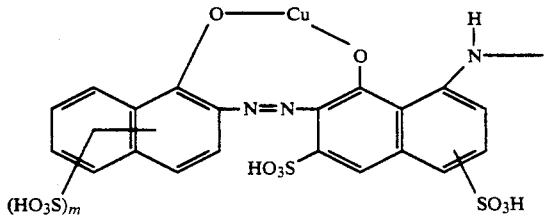

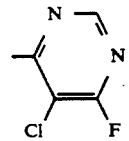

in which
m represents 1, 2 or 3.

2. A reactive dye according to claim 1, having the formula:

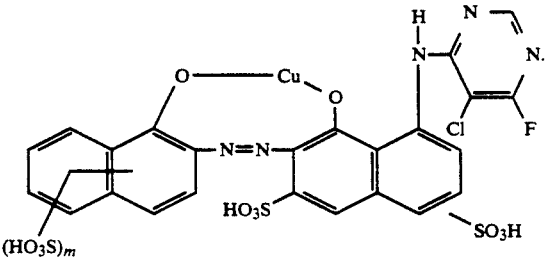

3. A process for dyeing or printing naturally occurring or synthetic materials containing hydroxyl or amide groups by applying thereto a reactive dye according to claim 1.

4. Naturally occurring or synthetic materials containing hydroxyl or amide groups which have been dyed with a dye according to claim 1.

* * * * *

UNITED STATES PATENT AND TRADEMARK OFFICE
CERTIFICATE OF CORRECTION

PATENT NO. : 5,256,773

DATED : October 26, 1993

INVENTOR(S) : Kunde et al.

It is certified that error appears in the above-identified patent and that said Letters Patent is hereby corrected as shown below:

Title Page & Col. 1, line 4    Title [54] Line 3 delete " RACTIVE MONDAZO " and substitute -- REACTIVE MONOAZO --

Col 3, line 5    Delete " 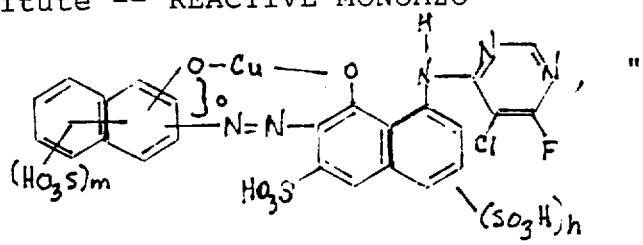 , "

and substitute

-- 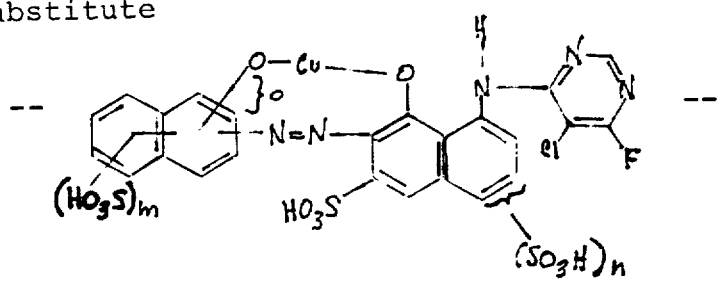 --

Col. 10, line 23    Delete " 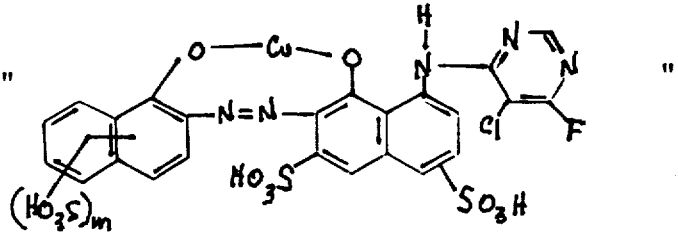 "

UNITED STATES PATENT AND TRADEMARK OFFICE
CERTIFICATE OF CORRECTION

PATENT NO. : 5,256,773

DATED : October 26, 1993

INVENTOR(S) : Kunde et al.

It is certified that error appears in the above-identified patent and that said Letters Patent is hereby corrected as shown below:

Col. 10, line 23 and substitute -- 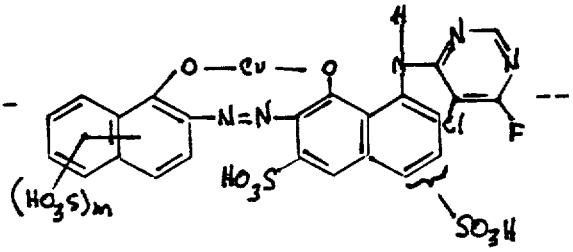 --

Signed and Sealed this

Twenty-fourth Day of May, 1994

Attest:

BRUCE LEHMAN

Attesting Officer    Commissioner of Patents and Trademarks